Sept. 18, 1945.   G. E. MOORE   2,385,296
CEMENTITIOUS ANCHORABLE HANGER SUPPORT
Filed May 19, 1944
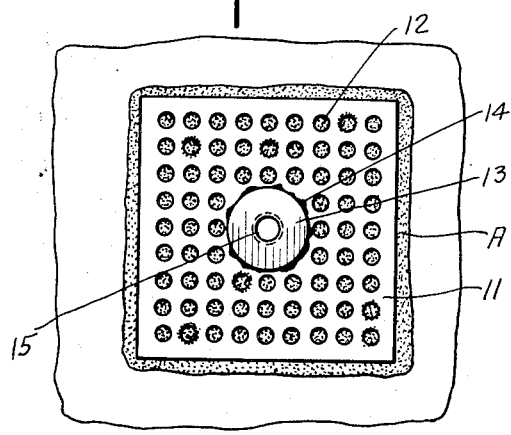
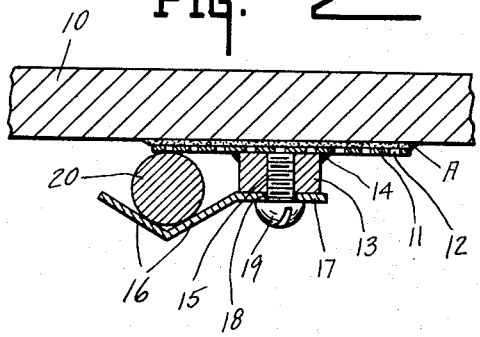
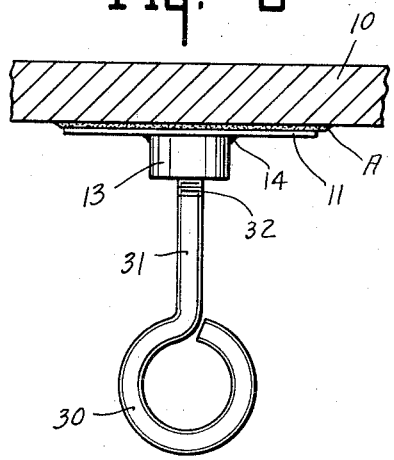
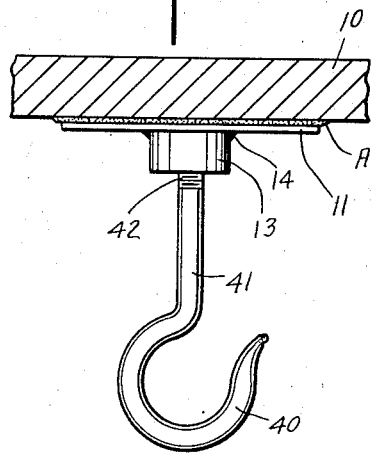
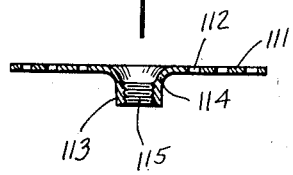
INVENTOR.
GOODLOE E. MOORE.
BY Lockwood, Goldsmith & Galt
ATTORNEYS.

Patented Sept. 18, 1945

2,385,296

UNITED STATES PATENT OFFICE 2,385,296

CEMENTITIOUS ANCHORABLE HANGER SUPPORT

Goodloe E. Moore, Danville, Ill.

Application May 19, 1944, Serial No. 536,307

3 Claims. (Cl. 248—304)

The invention relates to a hanger fixture for cementitious connection to a surface for the purpose of supporting upon such a surface some other material, conduit, cable, etc., and wherein the installation and retention is to be expeditiously and economically accomplished.

The connection is of comparatively permanent character and not subject to failure upon subjection to fresh or salt water, or wide variations in temperatures or after considerable age and within the limits of its intended load will not fail—nor will it fail under conventional shock.

This application is a continuation in part of copending application Serial No. 492,997, filed July 1, 1943, and entitled "Insulation support for ceilings, etc.," in turn a continuation in part of copending application Serial No. 478,900, filed March 12, 1943, each of which is formally made a part hereof.

The chief object of the present invention is to provide a cementitiously anchorable hanger capable of a multiplicity of subsidiary purposes, the primary one, in common with both copending applications being for support and retention purposes.

The chief feature of the present invention resides in the detachable connection between the base plate of a hanger, and the other material anchoring or retaining means.

Other objects and features of the invention will be set forth more fully hereinafter.

The full nature of the invention will be understood from the accompanying drawing and the following description and claims.

In the drawing

Fig. 1 is a plan view of a hanger base applied to a supporting surface.

Fig. 2 is a sectional view of the same with a cable, conduit or pipe supported thereby.

Fig. 3 is a side elevation of an eye type hanger.

Fig. 4 is a similar view of a hook type hanger.

Fig. 5 is a central sectional view of a modified form of base.

In the two copending applications aforesaid the hangers thereof, as intended herein, are shown adhesively secured at A to a supporting surface 10, see Figs. 1 and 2 herein. In the latter of these the base was of foraminated character and the base 11 herein likewise is foraminated as at 12. In the earliest application the base was substantially imperforate and in both applications the supporting connecting portions were of spindle type.

The peculiar character of the adhesive employed, its advantages, etc., are all set forth in the earliest application. The particular advantages of the foraminated base in conjunction with such an adhesive are set forth in the second application. All these advantages are retained herein. Wherefore attention will now be directed to the hangers hereof.

In Figs. 1 and 2 a collar member 13 is welded as at 14 to the base plate 11. This collar is centrally recessed as at 15 and this recess is tapped. Preferably the base plate 11 is imperforate or the collar recess 15 does not extend through the collar. This is to prevent adhesive passing into the recess and preventing other means being connected to the collar.

In Fig. 2 a clip having the angular portion 16 is carried by the tail portion 17, apertured at 18. A screw bolt 19 is threaded into the recess and thus a cable conduit or pipe 20 may be clamped between the base and the end of the clip member by the portion extending laterally of the central collar portion. In this respect the present invention is similar to those disclosed in the copending applications, but differs therefrom in that therein the anchoring portions penetrated and projected through the material to be supported. Herein such material 20 is embraced thereby.

In Fig. 3 the same base and collar is illustrated. However, herein the material embracing member is an eye 30 with shank 31 threaded at 32 for recess reception. Conduit, etc., may be passed through the eye 30. Coat hangers, etc., may be hung therefrom. Other uses are obvious.

In Fig. 4 a hook type member 40 with shank 41 threaded at 42 for recess reception is illustrated. Uses thereof are similar to that of the eye form.

In Fig. 5 a modification of collar and base is illustrated. In this form the base 111, apertured at 112 is centrally drawn at 114 to form collar 113, which is internally tapped as at 115. In this form adhesive may enter the recess. However, when the supporting portions hook or eye (see Figs. 4 or 3) are initially applied and the hanger unit then adhesively applied to a supporting surface, no disadvantage results. This form for mass production appears preferable, but requires a large and costly tooling cost.

Under present conditions the forms shown in Figs. 1 to 4 are preferred. Note that the collar may serve as a finger grip for facilitating plate application whenever anchor connection is to be made subsequent to base plate adhesion to the supporting surface.

Each form herein disclosed therefor has individual advantages. Herein two base and collar embodiments are disclosed and three anchor embodiments. All are interchangeable.

While the invention has been illustrated and described in great detail in the drawing and foregoing description, the same is to be considered as illustrative and not restrictive in character.

The several modifications described herein, as well as others which will readily suggest themselves to persons skilled in this art, all are considered to be within the broad scope of the invention, reference being had to the appended claims.

The invention claimed is:

1. A hanger adapted for cementitious application to a support having a smooth surface and to securely anchor other material to that support, the hanger comprising a base plate of considerable area, a centrally disposed threaded socket portion carried by the base, and means having a portion for embracingly engaging the other material and a portion having threaded connection with the socket portion, the plate being of foraminated character and the socket portion comprises a collar portion, the resulting socket being of recess type preventing adhesive access thereto.

2. A hanger adapted for cementitious application to a support having a smooth surface and to securely anchor other material to that support, the hanger comprising a base plate of considerable area, a centrally disposed threaded socket portion carried by the base plate, and means having one portion for embracingly engaging the other material and a second portion having threaded connection with the socket portion, the plate serving as a stop to prevent said second portion from engaging the support and thereby separating the plate from the support.

3. A hanger adapted for cementitious application to a support having a smooth surface and to securely anchor other material to that support, the hanger comprising a base plate of considerable area, a centrally disposed threaded socket portion carried by the base plate, and means having one portion for embracingly engaging the other material and a second portion having threaded connection with the socket portion, the plate serving as a stop to prevent said second portion from engaging the support and thereby separating the plate from the support, the base plate being of foraminated character for adhesive reception and lock formation in the foraminations and facilitating adhesive solvent evaporation and expediting adhesive setting between the support and said base plate.

GOODLOE E. MOORE.